No. 740,768. Patented October 6, 1903.

UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN & ANILIN FARBENFABRIK, OF OFFENBACH-ON-THE-MAIN, GERMANY.

BLACK MORDANT DYE AND PROCESS OF MAKING SAME.

SPECIFICATION forming part of Letters Patent No. 740,768, dated October 6, 1903.

Application filed March 31, 1903. Serial No. 150,382. (No specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, have invented new and useful Improvements in Black Mordant Dyes, of which the following is a specification.

My invention relates to the manufacture of primary disazo dyes, which may be obtained by combining in an alkaline solution nitro-derivatives of the ortho-diazo-phenol with the monoazo dyes, resulting by the reaction of diazo compounds of the naphthalene series upon 2:5-amidonaphthol-7-sulfonic acid in an acid solution.

The constitution of these coloring-matters is represented by the general formula

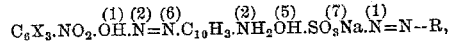

wherein "X" means H, $CH_3$, $NO_2$, Cl, $SO_3H$, COOH, and "R" a benzene residue.

Coloring-matters of this constitution have been unknown hitherto. I have found that these dyestuffs yield on wool when subsequently adding chromium mordants to the dye-bath very valuable shades from reddish black to bluish black and full black, distinguished by a prominent fastness against light, acids, alkalies, and milling.

In the following example I shall illustrate the nature of my invention and how it may be carried out and brought into practical effect, parts being by weight and degrees referring to the centigrade scale. Dissolve 16.25 parts of the acid sodium salt of the betanaphthylamin-3:6-disulfonic acid and three parts of soda in two hundred parts of water, then diazotize by means of 22.8 parts of hydrochloric acid of 20° Baumé and 3.5 parts of sodium nitrite. Pour in the mixture a solution neutralized by soda of 11.95 parts of 2:5-amidonaphthol-7-sulfonic acid and subsequently add eight parts of sodium acetate. In order to finish the combination, stir for twelve hours. Then combine the thus resulting monoazo dye while cooling with ice and keeping alkaline throughout the reaction with the diazo compound prepared as follows: 11.05 parts of picramate of sodium are dissolved in two hundred parts of water mixed with 3.5 parts of sodium nitrite and at zero degrees diazotized by 28.5 parts of hydrochloric acid of 20° Baumé. In order to complete the formation of the dyestuff, stir for about sixteen hours, heat up to 70°, salt, filter, press, and dry. The coloring-matter thus obtained forms a blackish powder which dissolves in water to a violet solution, which on addition of sodium lye changes to a bluish shade and to a red on adding hydrochloric acid. It is soluble in concentrated sulfuric acid with a claret-red color and yields on wool when subsequently adding chromium mordants to the dye-bath bluish-black shades of a prominent fastness against light, acids, alkalies, and milling.

The above example is merely typical, and I do not confine myself to its directions, as they may be varied. Thus the beta-naphthylamin-3:6-disulfonic acid may be replaced by any diazo compound of the naphthalene series, and the picramic acid may be replaced by all those nitro amido phenols which correspond to the general formula

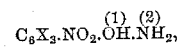

"X" meaning H, $CH_3$, Cl, $SOH_3$, COOH.

Now what I claim, and desire to secure by Letters Patent, is the following:

1. The process of making mordant dyes of the general formula

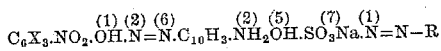

which consists in combining in an alkaline solution the diazo compounds of the amin of the general formula

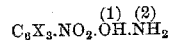

with the monoazo dyes, resulting by the reaction of diazo compounds of the naphthalene series upon 2:5-amidonaphthol-7-sulfonic acid in acid solution, whereby in the above formula "R" means a naphthalene residue, and "X" means H, $CH_3$, $NO_2$, Cl, $SO_3H$, COOH, substantially as described.

2. The process of making mordant coloring-matters of the general formula

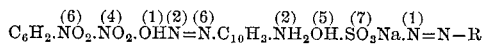

"R" meaning a naphthalene residue, which consists in combining in an alkaline solution diazotized picramic acid with the monoazo dyes, resulting by the reaction of diazo compounds of the naphthalene series upon 2:5-amidonaphthol-7-sulfonic acid in an acid solution, substantially as described.

3. The process of making a new mordant-dyeing disazo coloring-matter, which consists in combining in an alkaline solution diazotized picramic acid with the monoazo dye resulting by the reaction of diazotized beta-naphthylamin 3:6-disulfonic acid upon 2:5-amidonaphthol-7-sulfonic acid in acid solution, substantially as described.

4. As a new article of manufacture the new coloring-matter, which results from the reaction of diazotized picramic acid in an alkaline solution upon the monoazo dye obtained by combining in an acid solution diazotized beta-naphthylamin-3:6-disulfonic acid with 2:5-amidonaphthol-7-sulfonic acid which forms a blackish powder, dissolves in concentrated sulfuric acid to a claret-red, in water to a reddish-violet solution changing to a bluer violet on adding sodium lye, turning to a red on adding hydrochloric acid, and yields on wool when subsequently adding chromium mordants to the dye-bath, beautiful bluish-black shades of a prominent fastness against light, acids, alkalies, and milling, substantially as herein described.

In testimony whereof I have signed my name to this specification in the presence of two subscribing witnesses.

AUGUST LEOPOLD LASKA.

Witnesses:
EVA SATTLER,
HERMAN WEIL.